No. 802,220. PATENTED OCT. 17, 1905.
G. W. KNAPP.
COOKING VESSEL.
APPLICATION FILED MAR. 27, 1905.
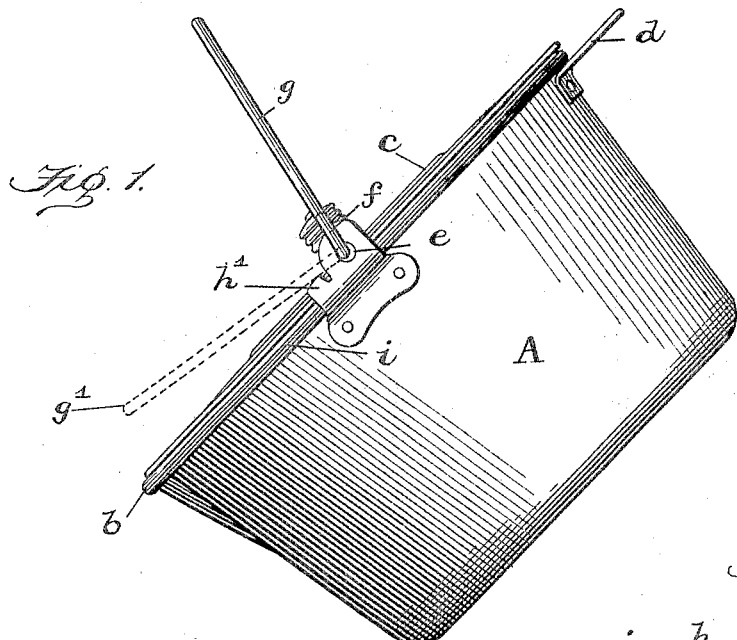
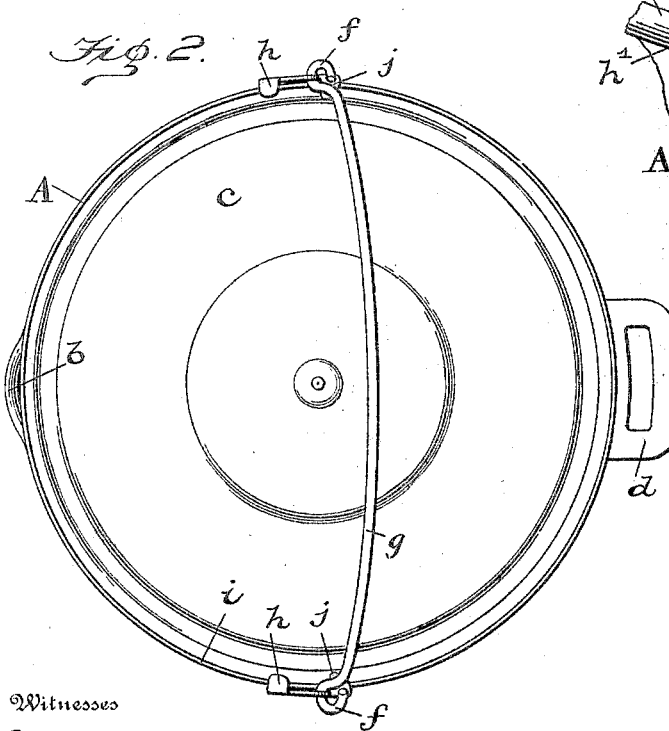
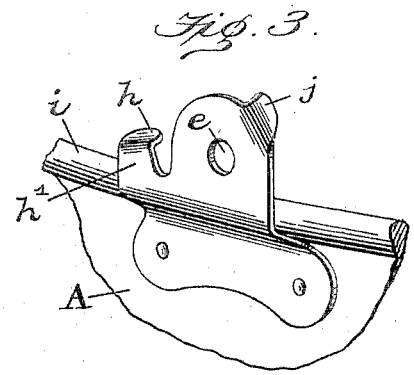
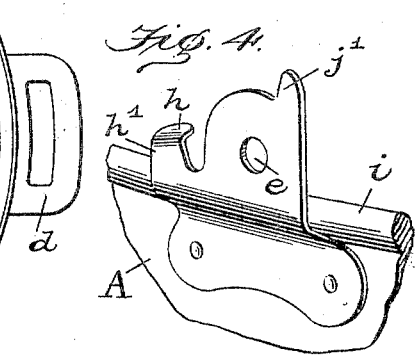
Witnesses
Edwin L. Bradford
J. Ferdinand Vogt
Inventor
George W. Knapp
By Munn & Co.
Attorneys

UNITED STATES PATENT OFFICE.

GEORGE W. KNAPP, OF BALTIMORE, MARYLAND, ASSIGNOR TO NATIONAL ENAMELING AND STAMPING COMPANY, A CORPORATION OF NEW JERSEY.

COOKING VESSEL.

No. 802,220.     Specification of Letters Patent.     Patented Oct. 17, 1905.

Application filed March 27, 1905. Serial No. 252,121.

*To all whom it may concern:*

Be it known that I, GEORGE W. KNAPP, a citizen of the United States, residing at Baltimore, in the State of Maryland, have invented certain new and useful Improvements in Cooking Vessels, of which the following is a specification.

This invention relates to cooking vessels, such as saucepans, stew-pans, preserving-kettles, and the like, which have bails.

An object of the invention is to provide a bail cooking vessel with means to prevent the bail from fully dropping onto the top edge of the wall of the vessel, whereby when the vessel is on a hot stove the vessel itself will not heat the bail by direct conduction.

Another object is to provide means that will prevent a loose cover from slipping forward when the vessel is tilted.

Another object is to provide a stop against which the bail will impinge when the bail is tilted a little from an upright position, such stop holding the bail upright, such stop also facilitating the tilting of the vessel.

To accomplish these objects with one bail, an improved bail-ear is provided.

Referring to the accompanying drawings, Figure 1 is a side view of a vessel having the improvements and shown in a tilted position. Fig. 2 is a top view of the vessel, showing the bail in an upright position. Fig. 3 is a perspective view, on a larger scale, of a piece of the vessel with one bail-ear attached. Fig. 4 is a view similar to Fig. 3, but showing a slight modification in the form of the stop.

The vessel A has a lip $b$ and an ordinary loose metal cover $c$. At the diametrically opposite side from the lip the vessel is provided with a rigid handle $d$.

The improved bail-ears each have a hole $e$, in which the hook ends $f$ of the bail $g$ are engaged. At one side the ear has a lateral lug $h$, which projects inwardly over or above the rim edge $i$ of the vessel. The lateral part $h$ serves as a seat on which the bail may rest when it is dropped to the position $g'$. (Shown in broken lines in Fig. 1.) This seat-lug prevents the bail from contacting with the top edge of the wall of the vessel. It will be understood, therefore, that when the vessel is on a hot stove the vessel itself will not heat the bail by direct conduction. The lateral part $h$ of the lugs also take over the cover $c$, and the diameter of the cover is slightly greater than the distance between the forward ends of the vertical parts $h'$ of the two lugs, and this prevents the cover from falling off or slipping forward when the vessel is tilted.

It will be observed that the lateral lug $h$ has position approximately on a level with or on a horizontal plane even with the hole $e$ and is at that side of ear nearest the lip $b$. The ear has at its opposite side, but higher than the hole $e$, a stop-tang $j$, which in Figs. 1, 2, and 3 is bent inward. When the bail is in an upright position and tilted a little, as seen in Figs. 1 and 2, it will impinge against the stop-tang $j$ and thereby will be sustained. It will also be seen by reference to Fig. 1 that when the vessel is tilted to pour out its liquid contents the bail will be held rigidly, and thus facilitate the operation.

The modification shown in Fig. 4 consists simply in having the stop-tang $j'$ project upward instead of being bent inward, as in the other figures. Either form will serve as a stop against which the bail may impinge.

Having thus fully described my invention, what I claim as new, and desire to secure by Letters Patent, is—

A cooking vessel having a single bail, and ears to which the bail is hooked, said ears provided at one side with a lug having a vertical part, $h'$, and a lateral part, $h$, which projects inwardly over the rim edge of the vessel and provided at the opposite side with a stop-tang higher than said lug.

In testimony whereof I affix my signature in presence of two witnesses.

GEORGE W. KNAPP.

Witnesses:
   WM. D. POULTNEY,
   GEO. W. KNAPP, Jr.